(12) United States Patent
Sun

(10) Patent No.: US 10,367,386 B2
(45) Date of Patent: Jul. 30, 2019

(54) POWER GENERATOR

(71) Applicant: Sang-Kyu Sun, Seoul (KR)

(72) Inventor: Sang-Kyu Sun, Seoul (KR)

(*) Notice: Subject to any disclaimer, the term of this patent is extended or adjusted under 35 U.S.C. 154(b) by 590 days.

(21) Appl. No.: 14/428,710

(22) PCT Filed: Dec. 31, 2012

(86) PCT No.: PCT/KR2012/011872
§ 371 (c)(1),
(2) Date: Mar. 17, 2015

(87) PCT Pub. No.: WO2014/046348
PCT Pub. Date: Mar. 27, 2014

(65) Prior Publication Data
US 2015/0244216 A1    Aug. 27, 2015

(30) Foreign Application Priority Data
Sep. 20, 2012   (KR) .................. 10-2012-0104828

(51) Int. Cl.
*H02K 16/02*   (2006.01)
*H02K 21/12*   (2006.01)
(Continued)

(52) U.S. Cl.
CPC .............. *H02K 1/278* (2013.01); *H02K 5/16* (2013.01); *H02K 5/20* (2013.01); *H02K 7/116* (2013.01);
(Continued)

(58) Field of Classification Search
CPC ........ H02K 16/04; H02K 5/225; H02K 1/278; H02K 5/16; H02K 5/20; H02K 9/02; H02K 16/02; H02K 7/116; H02K 21/12
(Continued)

(56) References Cited

U.S. PATENT DOCUMENTS 4,900,965 A * 2/1990 Fisher ................ H02K 1/06
310/12.12
5,864,198 A * 1/1999 Pinkerton .............. H02K 19/38
310/112
(Continued)

FOREIGN PATENT DOCUMENTS

JP    11-275826    10/1999    ............. H02K 16/02
KR    20-0217447    1/2001    ............. H02K 15/02
(Continued)

OTHER PUBLICATIONS

Sears et al., University Physics 6th Edition, Addison-Wesley Publishing Company, pp. 349-350, 1982.*
(Continued)

*Primary Examiner* — Thomas Truong
(74) *Attorney, Agent, or Firm* — Harness, Dickey & Pierce, P.L.C.

(57) ABSTRACT

Disclosed is a generator wherein a rotary shaft is rotatably supported by a rotary shaft rest, and an inner casing is formed in a cylindrical hollow shape in such a way that one side thereof is fixedly engaged to the rotary shaft, thus rotating by the rotary shaft, and another side thereof is engaged to a rotary shaft rest by an inner casing engaging support member which includes a thrust bearing, and a plurality of through holes and ventilation holes are formed at the side surfaces and outer circumferential surfaces of the inner casing and the outer casing.

5 Claims, 3 Drawing Sheets

(51) Int. Cl.
  *H02K 5/16*    (2006.01)
  *H02K 5/20*    (2006.01)
  *H02K 1/27*    (2006.01)
  *H02K 7/116*    (2006.01)
  *H02K 9/02*    (2006.01)

(52) U.S. Cl.
  CPC ............... *H02K 9/02* (2013.01); *H02K 16/02* (2013.01); *H02K 21/12* (2013.01)

(58) Field of Classification Search
  USPC .............................. 310/71, 114, 266, 89, 90
  See application file for complete search history.

(56) References Cited

U.S. PATENT DOCUMENTS

| | | | |
|---|---|---|---|
| 6,049,152 A | 4/2000 | Nakano | 310/114 |
| 6,114,784 A * | 9/2000 | Nakano | B60K 6/26 |
| | | | 310/113 |
| 6,590,312 B1 * | 7/2003 | Seguchi | B60K 6/26 |
| | | | 310/114 |
| 2011/0210636 A1 | 9/2011 | Kuhlmann-Wilsdorf | 310/178 |

FOREIGN PATENT DOCUMENTS

| | | | | |
|---|---|---|---|---|
| KR | 10-2010-0132102 | 12/2010 | ............. | H02K 21/00 |
| KR | 10-1162477 | 6/2012 | ............... | H02K 1/22 |

OTHER PUBLICATIONS

International Search Report (ISR) dated May 31, 2013 of International Patent Application No. PCT/KR2012/011872.

\* cited by examiner

POWER GENERATOR

CROSS-REFERENCE TO RELATED APPLICATONS

This application is a national phase application of PCT Application No. PCT/KR2012/011872, filed on 31 Dec. 2012, which claims the benefit and priority to Korean Patent Application No. 10-2012-0104828, filed 20 Sep. 2012. The entire disclosures of the applications identified in this paragraph are incorporated herein by references.

FIELD

The present invention relates to a generator, and in particular to a generator which makes it possible to decrease a rotational resistance of a rotor and increase a power generation efficiency in such a way that an inner casing is configured to rotate.

BACKGROUND

The intensity of electromotive force which generates at a generator is proportional to the intensity of magnetic field, the length of a conductor and a relative speed between the magnetic field and the conductor. The intensity of electromotive force may be increased by increasing the intensity of magnetic field or making longer the conductor or increasing faster the relative speed between the magnetic field and the conductor. It is typical that the electromotive force is increased by making faster the relative speed between the magnetic field and the conductor. For this, it needs to increase the rotational speed of the rotor, which requires a high speed rotation, so it becomes impossible to obtain a predetermined electromotive force in case where a low speed rotational force as in a tidal electric power generation, a wind power generation and a road power generation is used.

The development of a low speed generator which is able to obtain a predetermined electromotive force using a low speed rotational force is under way. One example of such a generator is disclosed in the Korean Utility Model No. 20-0217447 entitled "Low speed generator" in FIG. 5.

The low speed generator in FIG. 5 is directed to a structure wherein a high electromotive force may be obtained from a low speed rotational force in such a way that a rotor 10 and a stator 20 rotate in the opposite directions. In the above low sped generator, a fixed shaft 1 is rotatably fixed at a rotation cylinder 40, and the rotor 10 at one side of which a commutator bar 12 is disposed, is installed at the fixed shaft 1, and the cylinder stator 20 is installed at the fixed shaft 1 and is positioned at an outer side of the rotor 10. There is provided a train of gears which are configured to transfer the rotational driving force of the rotation cylinder 40 to the rotor 10 and the stator 20 in order for the rotor 10 and the stator 2 to rotate in the opposite directions.

However, in order to increase a relative speed, the above-mentioned conventional low speed generator is configured to rotate the rotor and the stator in the opposite directions by using a plurality of the trains of the gears, so the configuration of such a conventional low speed generator is complicated, and the assembling is hard, and the weight is heavy, and the manufacturing cost increases, which results in low economic feasibility.

SUMMARY

Disclosure of The Invention

Accordingly, the present invention is made to resolve the above-mentioned problems. It is an object of the present invention to provide a generator which makes it possible to obtain a predetermined electromotive force in such a way to lower a rotational resistance by rotating an inner casing based on the provision of an inner casing engaging support member having a simple bearing.

To achieve the above object, there is provided a generator which may include a rotary shaft which rotates by an external driving force, a cylindrical rotor which is fixedly engaged to the rotary shaft and rotates by the rotary shaft, a magnet which is installed at an outer side surface of the rotor, a cylindrical stator which is rotatably engaged to an outer side of the rotary shaft, a winding coil which is installed at the stator and is connected to an external wire, a cylindrical inner casing one side surface of which is engaged to an outer side of the stator and is separated from the rotary shaft and another side surface of which rotates by the inner casing engaging support member having a bearing, an a cylindrical outer casing both side ends of which are engaged to a rotary shaft rest.

The generator of the present invention may include a rotary shaft which rotates by an external driving force.

In addition, the rotary shaft may be supported by the rotary shaft rest.

In addition, the rotor may be fixedly engaged to the rotary shaft together with the magnet which is installed at an outer surface.

In addition, the stator may be engaged to the rotary shaft rest to the outer side of the rotor.

In addition, the winding coil may be engaged to a slot of the stator by using a magnetic and nonmagnetic-combined flexible material and may be configured to extent a wire to the outside.

In addition, the inner casing may be configured in such a way that one side surface of the inner casing is engaged to the rotary shaft, and another side surface of which may be engaged to the rotary shaft rest using the inner casing engaging support member which has a bearing.

In addition, the inner casing engaging support member which has a bearing may be configured to engage one side surface of the inner casing and the rotary shaft rest.

In addition, the inner casing engaging support member which has a bearing may include a wire through hole formed at a side surface thereof.

In addition, the outer casing may be configured to engage both side surfaces thereof to the rotary shaft rest to an outer side surface of the inner casing.

In addition, a plurality of ventilation holes may be formed on the outer surfaces and the side surfaces of the inner casing and the outer casing.

In addition, a magnet may be attached to an inner side of the inner casing 150 and may be symmetrical to the magnet of the rotator 110.

The magnet of the inner casing 150 and the magnet of the rotator may have opposite N-pole and S-pole.

INDUSTRIAL EFFECTS

According to the generator of the present invention, it is possible to obtain a predetermined electromotive force thanks to the increased relative speed in such a way to largely reduce a rotational resistance which occurs at a rotator by rotating an inner casing, while inhibiting a coking phenomenon between the magnet of the rotator and the winding coil of the stator and eddy current.

In addition, the durability may be enhanced by inhibiting the occurrence of heat. Energy may be saved thanks to the use of a low wind speed, while not largely using external driving force.

In addition, the configuration of the generator of the present invention may be simplified thanks to a relatively simplified configuration which uses an inner casing engaging support member which is equipped with a bearing for enhancing a relative speed between the rotator and the stator. The manufacturing of a large size generator may be easy irrespective of rated capacity, and the cost of the product may be low.

DRAWINGS

The present invention will become better understood with reference to the accompanying drawings which are given only by way of illustration and thus are not limitative of the present invention, wherein.

DETAILED DESCRIPTION

Figure 1:
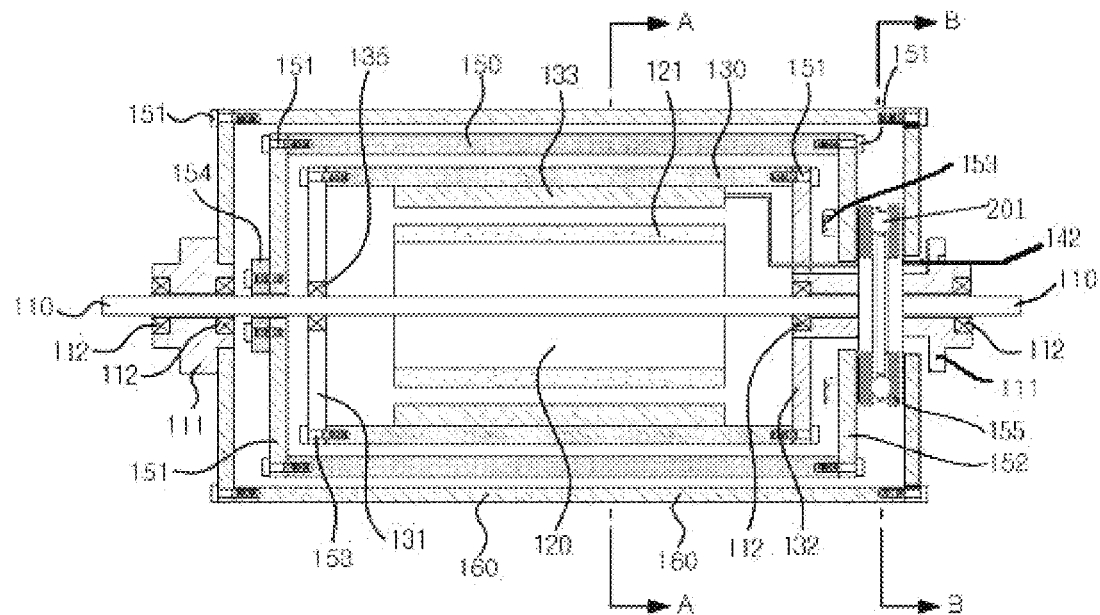
FIG. 1 is a horizontal cross sectional view illustrating a generator according to an exemplary embodiment of the present invention.
Figure 2:
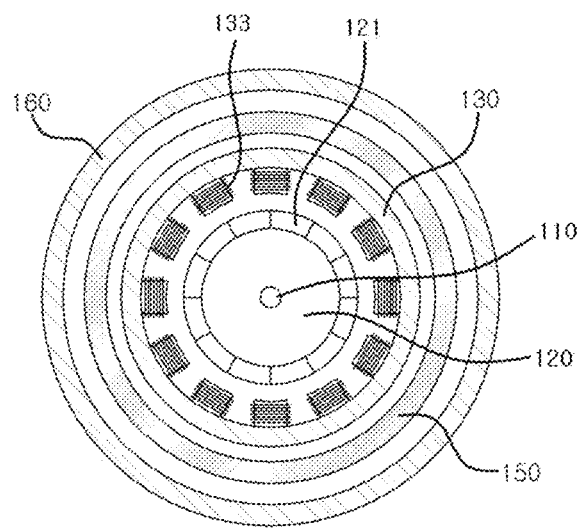
FIG. 2 is a vertical cross sectional view taken along line A-A in FIG. 1.
Figure 3:
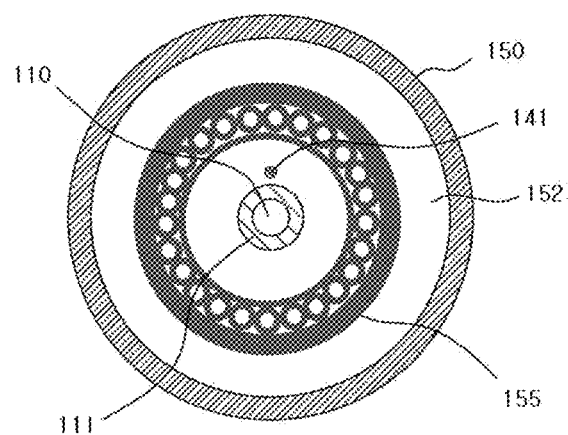
FIG. 3 is a vertical cross sectional view taken along line B-B in FIG. 1.
Figure 4:
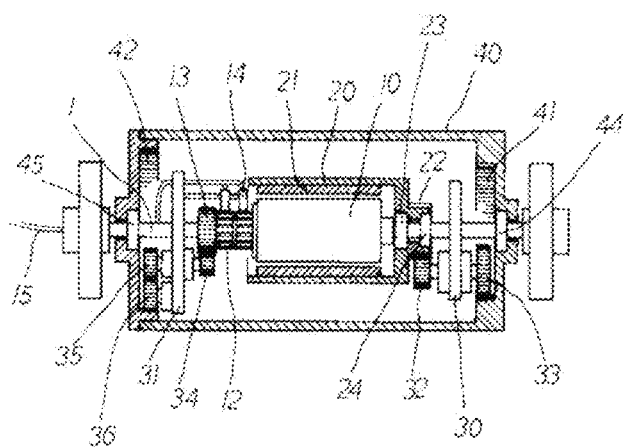
FIG. 4 is a horizontal cross sectional view illustrating a conventional low speed generator.
Figure 5:
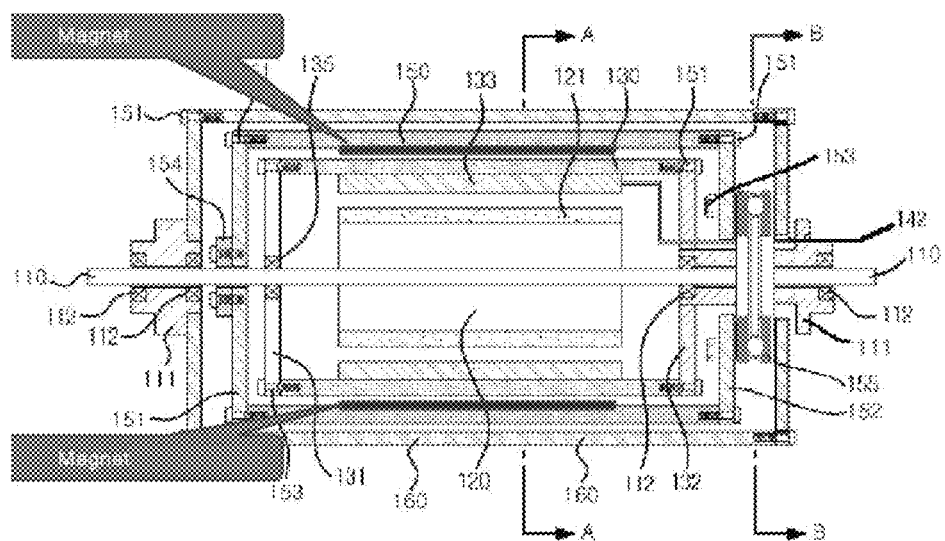
FIG. 5 is a horizontal cross sectional view illustrating a generator according to an exemplary embodiment of the present invention.

The generator according to an exemplary embodiment of the present invention will be described with reference to the accompanying drawings. As illustrated in FIGS. 1 to 4, the generator 1 according to an exemplary embodiment of the present invention may include a rotary shaft 110, a rotary shaft rest 111, a rotator 120, a stator 130, an inner casing 150, an inner casing engaging support member 155 which has a bearing and an outer casing 160.

The rotary shaft 110 may rotate by a driving force from an external driving force generation unit, wherein both side ends of the rotary shaft 110 are rotatably supported by the rotary shaft rest 111.

The rotator 120 may be configured in a cylindrical shape and is fixedly engaged to the rotary shaft 110 which passes through the center thereof, and a magnet 121 is attached to an outer circumferential surface of the rotator 120.

The stator 130 may be configured in a cylindrical hollow shape and may be disposed at an outer side of the rotator 120. A slot for winding a coil may be made of a magnetic or nonmagnetic material.

One side plate 131 of the stator 130 is engaged to a stator support unit 135 which has a bearing inside of the stator support rest 135 for supporting the stator 130, and another side plate 132 is engaged to a rotary shaft rest 111 which has a bearing inside of the rotary shaft rest 111.

The rotary shaft bearing 112 is a member for rotatably engaging the rotary shaft 110 and the stator 130. The stator 130 may be damaged thanks to the presence of the rotary shaft bearing 112 even though the rotary shaft 110 rotates at a high speed.

Therefore, the stator 130 may be engaged in such a way that one side of the stator 130 is fixed at the rotary shaft rest 111 and may always keep a stopped state irrespective of the rotational force of the rotary shaft 110.

The inner casing 150 is made of a cylindrical hollow magnetic material and rotates at an outer side of the stator 130.

The rotary shaft 101 is engaged to side plates "a" and "b" (151 and 152) of the inner casing 150 in such a way that the rotary shaft 101 passes through the center of the side plates.

The side plate "a" 151 of the inner casing 150 is fixedly engaged through an engaging member 154 to the rotary shaft 110. The side plate "b" 152 of the inner casing 150 is engaged to the rotary shaft rest 111 with the aid of the inner casing engaging support member 155 which has a bearing.

The inner casing engaging support member 155 having a bearing forms a wire through hole 141 formed at an inner side.

A plurality of ventilation holes may be formed at the outer circumferential surfaces or side surfaces of the inner casing 150 and the outer casing 160. Both side surfaces of the outer casing 160 may be engaged to the rotary shaft rest 111 to an outer side of the inner casing 150.

The operations of the above-described generator 1 according to the present invention will be described When an external driving force is transferred from the rotary shaft 110, the rotary shaft 110 supported by the rotary shaft rest 111 rotates.

When the rotary shaft 110 rotates, the rotary 130 fixedly engaged to the rotary shaft 110, and the inner casing 150 rotate in the same directions. At this time, the inner casing 150 rotates being engaged with one side surface of the inner casing engaging support member 155 which has a bearing, and one side surface of the inner casing engaging support member 155 is fixedly engaged to the rotary shaft rest 111.

In addition, one side surface of the stator 130 may be separated from the rotary shaft 110 by means of an engaging member 154, and one side surface is engaged by the rotary shaft rest 111 which has a bearing inside of the rotary shaft rest 111, thus keeping a stopped state.

The electromotive force which generates by the magnet 121 installed at the rotator 110 and the winding coil 133 installed at the stator 130 transfers along the wound coil 133 and through the stator side plate "b" 132 and passes through a space formed between the inner casing side plate "b" 152 and the rotary shaft rest 111 and outputs to the outside in safe through the wire through holes 141 formed at the side surface of the engaging support member 155 and the ventilation holes of the outer casing. The engaging support member 155 includes a thrust bearing member 201.

Therefore, since the rotator 110 and the inner casing 150 rotate together in the same directions, rotational resistance barely occurs thanks to the inhibitions of the coking phenomenon and the eddy current between the rotator 110 and the inner casing 150, for which even though the rotator 110 rotates at a low speed, the relative speed between the magnet 121 of the rotator 110 and the winding coil 133 of the stator 130 may increase, thus obtaining a predetermined electromotive force.

In addition, a lot of rotational resistance has occurred in the past because of the formation of the magnetic field between the rotator 120 and the stator 130 due to the coil winding on the field core of the stator 130. In the present invention, magnetic field may be induced when the rotator 120 and the inner casing 150 rotate in the same directions, thanks to the use of the winding coil 133 wound around the slot formed of a combined flexible magnetic and nonmagnetic materials. A predetermined electromotive force may generate by the stator 130 wound around the slot made of combined flexible magnetic and nonmagnetic materials, while naturally generating a rotational force.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A generator, comprising:
a rotary shaft which rotates by an external driving force;
a stator which is:
configured in a cylindrical hollow shape,
disposed at an outer side of the rotary shaft,
wound with coils, and
configured to induce a magnetic field from a coil wound around the stator;
a wire which is connected to a coil wound at an inner side of the stator and passes through a side plate "b" of the stator and passes through a space formed between the side plate "b" of an inner casing and a rotary shaft rest and extends outside through a wire through hole of a side surface of an inner casing engaging support member and a ventilation hole of an outer casing;
a cylindrical magnetic inner casing which is engaged to the rotary shaft and the rotary shaft rest; and
the rotary shaft rest which includes a bearing inside of the rotary shaft rest so as to support the rotary shaft.

2. The generator of claim 1,
wherein the inner casing engaging support member is configured to engage one side of the inner casing and one side of the rotary shaft rest and includes a thrust bearing; and
a cylindrical nonmagnetic outer casing which is fixed at the rotary shaft rest to an outer side of the inner casing which rotates by the rotary shaft.

3. The generator of claim 2, wherein the inner casing engaging support member includes an outer side of the inner casing engaging support member is engaged with the cylindrical magnetic inner casing and rotates, and an inner side of the inner casing engaging support member is fixedly engaged to the rotary shaft rest.

4. The generator of claim 2, wherein the cylindrical nonmagnetic outer casing is fixedly engaged at the rotary shaft rest to an outer side of each of both side surfaces of the cylindrical magnetic inner casing.

5. The generator of claim 1, wherein the cylindrical magnetic inner casing is configured in such a way that one side of the cylindrical magnetic inner casing is engaged to the rotary shaft by an engaging member, and another side of the cylindrical magnetic inner casing is engaged to the rotary shaft rest by means of the inner casing engaging support member which has a thrust bearing and is made of a cylindrical hollow magnetic material and rotates.

\* \* \* \* \*